United States Patent
Hertel et al.

(10) Patent No.: US 10,112,615 B2
(45) Date of Patent: Oct. 30, 2018

(54) SYSTEM AND METHOD OF REACTING TO WHEEL SLIP IN A TRACTION VEHICLE

(71) Applicant: Deere & Company, Moline, IL (US)

(72) Inventors: Benjamin J. Hertel, S. Coffeyville, OK (US); Clayton G. Janasek, Independence, KS (US); Nathan J. Horstman, Durango, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/845,186

(22) Filed: Sep. 3, 2015

(65) Prior Publication Data

US 2017/0066448 A1 Mar. 9, 2017

(51) Int. Cl.
*B60W 30/18* (2012.01)
*B60K 28/16* (2006.01)
*B60L 3/10* (2006.01)

(52) U.S. Cl.
CPC ....... *B60W 30/18172* (2013.01); *B60K 28/16* (2013.01); *B60L 3/10* (2013.01); *B60Y 2200/22* (2013.01); *B60Y 2200/411* (2013.01)

(58) Field of Classification Search
CPC ....... B60W 30/18172; B60L 3/10; E02F 3/43; E02F 3/431; E02F 9/24; B60K 28/16; B60Y 2200/22; B60Y 2200/411
See application file for complete search history.

(56) References Cited

U.S. PATENT DOCUMENTS

| | | | |
|---|---|---|---|
| 3,913,680 A | 10/1975 | Carlson | |
| 4,037,544 A | 7/1977 | Cantone | |
| 4,157,118 A | 6/1979 | Suganami et al. | |
| 4,177,870 A | 12/1979 | Henn | |
| 4,518,044 A | 5/1985 | Wiegardt et al. | |
| 4,846,283 A * | 7/1989 | Batcheller | A01B 63/112 172/10 |
| 5,147,010 A | 9/1992 | Olson et al. | |

(Continued)

FOREIGN PATENT DOCUMENTS

| | | |
|---|---|---|
| DE | 1937314 | 2/1971 |
| DE | 3017570 | 11/1981 |

(Continued)

OTHER PUBLICATIONS

Office Action from the US Patent and Trademark Office for U.S. Appl. No. 14/845,190 dated Nov. 29, 2016 (6 pages).

(Continued)

*Primary Examiner* — Thomas G Black
*Assistant Examiner* — Sze-Hon Kong
(74) *Attorney, Agent, or Firm* — Michael Best & Friedrich LLP (57) ABSTRACT

A vehicle traction control system for a vehicle having a prime mover, at least one wheel for providing tractive effort on a support surface and being capable of slipping, and a transmission having an input side operably coupled to the prime mover and an output side operably coupled to the at least one wheel. The traction control system includes a controller operable to react to wheel slip by automatically activating a plurality of reactions for reducing wheel slip, wherein the plurality of reactions are tiered such that the controller activates each reaction sequentially in a predetermined order.

19 Claims, 3 Drawing Sheets

(56) References Cited

U.S. PATENT DOCUMENTS

| | | | | |
|---|---|---|---|---|
| 5,505,267 | A | 4/1996 | Orbach et al. | |
| 5,564,507 | A | 10/1996 | Matsushita et al. | |
| 5,613,581 | A | 3/1997 | Fonkalsrud et al. | |
| 5,684,691 | A | 11/1997 | Orbach et al. | |
| 5,755,291 | A * | 5/1998 | Orbach | A01B 63/112 172/2 |
| 5,911,769 | A * | 6/1999 | Orbach | A01B 63/112 172/7 |
| 6,119,786 | A | 9/2000 | Creger et al. | |
| 6,144,910 | A * | 11/2000 | Scarlett | A01B 63/023 172/4.5 |
| 6,162,146 | A | 12/2000 | Hoefling | |
| 6,234,254 | B1 | 5/2001 | Dietz et al. | |
| 6,317,676 | B1 | 11/2001 | Gengler et al. | |
| 6,405,844 | B1 | 6/2002 | Takamatsu | |
| 6,857,494 | B2 | 2/2005 | Kobayashi et al. | |
| 7,452,306 | B2 | 11/2008 | Casey | |
| 7,734,398 | B2 | 6/2010 | Manneppalli | |
| 7,770,681 | B2 | 8/2010 | Marathe et al. | |
| 7,779,947 | B2 | 8/2010 | Stratton | |
| 7,867,136 | B2 | 1/2011 | Schifferer | |
| 7,974,756 | B2 | 7/2011 | Ikari | |
| 8,060,284 | B2 | 11/2011 | Hendryx | |
| 8,083,004 | B2 | 12/2011 | Knight, Jr. | |
| 8,103,417 | B2 | 1/2012 | Gharsalli et al. | |
| 8,175,785 | B2 | 5/2012 | Turski et al. | |
| 8,540,048 | B2 | 9/2013 | Will et al. | |
| 8,600,621 | B2 | 12/2013 | Callaway et al. | |
| 8,626,404 | B2 | 1/2014 | Thomson et al. | |
| 8,726,543 | B2 * | 5/2014 | Kelly | E02F 3/847 172/2 |
| 8,788,160 | B2 | 7/2014 | Lorentz et al. | |
| 8,825,314 | B2 | 9/2014 | Jensen | |
| 8,880,301 | B2 | 11/2014 | Velde | |
| 8,983,739 | B2 | 3/2015 | Faivre | |
| 9,086,104 | B2 | 7/2015 | McCann et al. | |
| 9,213,331 | B2 | 12/2015 | Johnson et al. | |
| 2001/0056319 | A1* | 12/2001 | Rocke | E02F 3/434 701/50 |
| 2003/0121674 | A1* | 7/2003 | Scarlett | A01B 63/111 172/2 |
| 2004/0006957 | A1* | 1/2004 | David Sheidler | A01B 63/1006 56/10.2 G |
| 2006/0042838 | A1 | 3/2006 | Yeoman et al. | |
| 2006/0245896 | A1* | 11/2006 | Alshaer | E02F 9/2029 414/685 |
| 2006/0287792 | A1* | 12/2006 | Jarrett | A01B 79/005 701/50 |
| 2008/0234901 | A1* | 9/2008 | Johnson | E02F 9/2029 701/50 |
| 2008/0234902 | A1* | 9/2008 | Johnson | E02F 9/2029 701/50 |
| 2008/0257569 | A1 | 10/2008 | Foster et al. | |
| 2008/0257570 | A1 | 10/2008 | Keplinger et al. | |
| 2009/0223215 | A1* | 9/2009 | Kelly | E02F 3/7636 60/426 |
| 2010/0009806 | A1* | 1/2010 | Shirao | B60W 10/06 477/52 |
| 2010/0174454 | A1* | 7/2010 | Saito | B60W 30/18172 701/50 |
| 2010/0300711 | A1* | 12/2010 | Pirotais | A01B 63/1145 172/10 |
| 2012/0133202 | A1* | 5/2012 | Mui | B60L 3/10 303/152 |
| 2012/0239260 | A1* | 9/2012 | Ishikawa | A01B 63/112 701/50 |
| 2012/0293316 | A1 | 11/2012 | Johnson et al. | |
| 2013/0085036 | A1* | 4/2013 | Anderson | B60W 10/06 477/110 |
| 2013/0103273 | A1* | 4/2013 | von Schonebeck | F16H 61/48 701/51 |
| 2013/0158804 | A1* | 6/2013 | Callaway | B60T 8/175 701/41 |
| 2013/0173122 | A1* | 7/2013 | Liu | E02F 9/265 701/50 |
| 2013/0289832 | A1* | 10/2013 | Pirotais | A01B 69/008 701/50 |
| 2014/0005899 | A1 | 1/2014 | Byers et al. | |
| 2014/0039772 | A1* | 2/2014 | Jensen | B60K 23/0808 701/69 |
| 2014/0121911 | A1 | 5/2014 | Davis et al. | |
| 2014/0200775 | A1* | 7/2014 | Shirao | B60W 10/06 701/50 |
| 2014/0277966 | A1 | 9/2014 | Kelly | |
| 2014/0343800 | A1* | 11/2014 | Nelson | E02F 3/845 701/49 |
| 2015/0120103 | A1 | 4/2015 | Keys, II et al. | |
| 2015/0139767 | A1 | 5/2015 | Moriki et al. | |
| 2015/0149054 | A1 | 5/2015 | Gentle et al. | |
| 2015/0233094 | A1 | 8/2015 | Maiyur | |
| 2015/0233309 | A1 | 8/2015 | Maiyur | |
| 2016/0032564 | A1* | 2/2016 | Pinther, II | E02F 3/3414 60/327 |
| 2016/0160470 | A1* | 6/2016 | Kishimoto | B60L 1/003 475/5 |

FOREIGN PATENT DOCUMENTS

| | | |
|---|---|---|
| DE | 3230330 | 2/1984 |
| DE | 3604218 | 2/1987 |
| DE | 4316421 | 11/1994 |
| DE | 69030503 | 10/1997 |
| DE | 19939442 | 2/2001 |
| DE | 10351376 | 5/2004 |
| DE | 102014206234 | 10/2015 |
| EP | 0241748 | 10/1987 |
| EP | 0338141 | 10/1989 |
| EP | 0500403 | 8/1992 |
| EP | 2556735 | 2/2013 |
| GB | 1086662 | 10/1967 |
| GB | 2428755 | 2/2007 |
| JP | H0790879 | 4/1995 |
| JP | H7090879 | 4/1995 |

OTHER PUBLICATIONS

Final Office Action from the US Patent and Trademark Office for U.S. Appl. No. 14/845,190 dated Mar. 24, 2017 (7 pages).
DE102016216587.9 Search Report from the German Intellectual Property Office dated May 10, 2017 (9 pages, which includes a Statement of Relevance).
DE102016216584.4 Search Report from the German Intellectual Property Office dated May 10, 2017 (9 pages, which includes a Statement of Relevance).
DE102016216588.7 Search Report from the German Intellectual Property Office dated May 16, 2017 (11 pages, which includes a Statement of Relevance).
Office Action from the US Patent and Trademark Office for U.S. Appl. No. 14/845,192 dated Jun. 8, 2017 (10 pages).
Office Action from the US Patent and Trademark Office for U.S. Appl. No. 14/845,192 dated Aug. 22, 2017 (6 pages).
DE102016216649.2 Search Report from the German Intellectual Property Office dated Jul. 19, 2017 (13 pages, which includes a Statement of Relevance).

* cited by examiner

SYSTEM AND METHOD OF REACTING TO WHEEL SLIP IN A TRACTION VEHICLE

BACKGROUND

The present disclosure relates to regulating wheel slip in a traction vehicle.

When a traction vehicle, such as a motor grader, is in low traction conditions, too much wheel slip can cause the vehicle to become less productive and can also degrade the quality of the support surface under the wheel. Poor tractive conditions have previously been addressed by limiting the torque to an electric drive motor, by applying individual wheel brakes to a slipping wheel, and by applying hydrostatic torque drive systems and infinitely variable hydraulic drive torque limiting systems. Other reactions to wheel slip are typically in the hands of the operator.

SUMMARY

Providing a method of automatic traction control for reduced wheel slip will improve the quality of the support surface left behind the vehicle, improve vehicle productivity, assist novice vehicle operators, and reduce the workload of experienced vehicle operators.

In one aspect, the invention provides a vehicle traction control system for a vehicle having a prime mover, at least one wheel for providing tractive effort on a support surface and being capable of slipping, and a transmission having an input side operably coupled to the prime mover and an output side operably coupled to the at least one wheel. The traction control system includes a controller operable to react to wheel slip by automatically activating a plurality of reactions for reducing wheel slip, wherein the plurality of reactions are tiered such that the controller activates each reaction sequentially in a predetermined order.

In yet another aspect, the invention provides a vehicle traction control system for a vehicle having a prime mover, at least one wheel for providing tractive effort on a support surface, and a transmission having an input side operably coupled to the prime mover and an output side operably coupled to the at least one wheel. The traction control system includes a controller operable to react to wheel slip by activating a plurality of reactions for reducing wheel slip, operable to receive input from a user to select one or more of the plurality of reactions, and operable to automatically activate at least one of the selected plurality of reactions in response to a reaction threshold level of wheel slip.

In another aspect, the invention provides a method of automatically regulating wheel slip in a traction vehicle having a prime mover, at least one wheel for providing tractive effort on a support surface, and a transmission having an input side operably coupled to the prime mover and an output side operably coupled to the at least one wheel. The method includes automatically reacting to wheel slip by activating a plurality of reactions for reducing wheel slip in a predetermined order.

In yet another aspect, the invention provides a method of automatically regulating wheel slip in a traction vehicle having a prime mover, at least one wheel for providing tractive effort on a support surface, a transmission having an input side operably coupled to the prime mover and an output side operably coupled to the at least one wheel. The method includes receiving input from a user, into a controller, selecting one or more of a plurality of reactions for reducing wheel slip, and automatically activating at least one of the selected plurality of reactions in response to a reaction threshold level of wheel slip.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
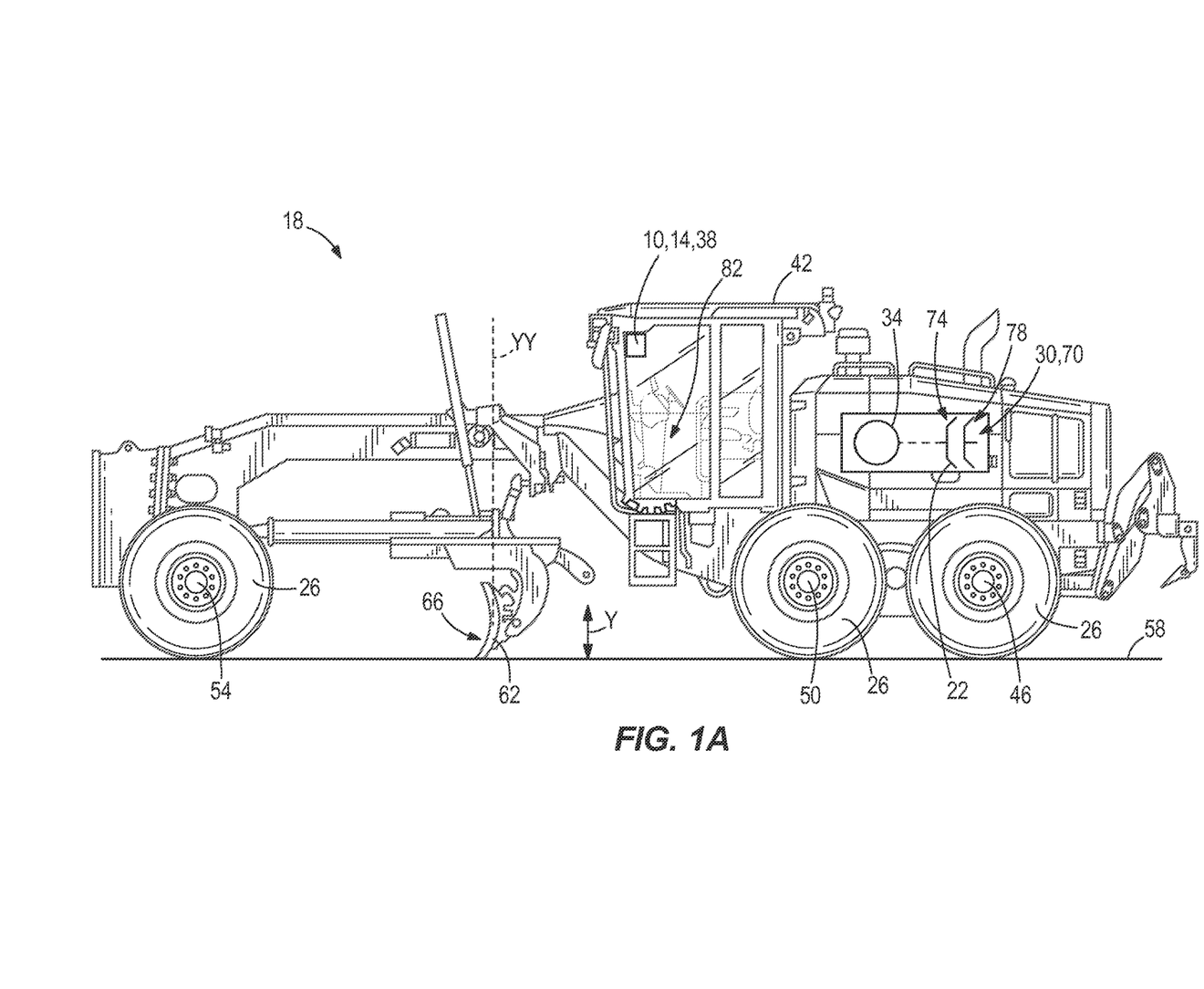
FIG. 1A is a traction vehicle with a traction control system in accordance with the present disclosure.
Figure 1B:
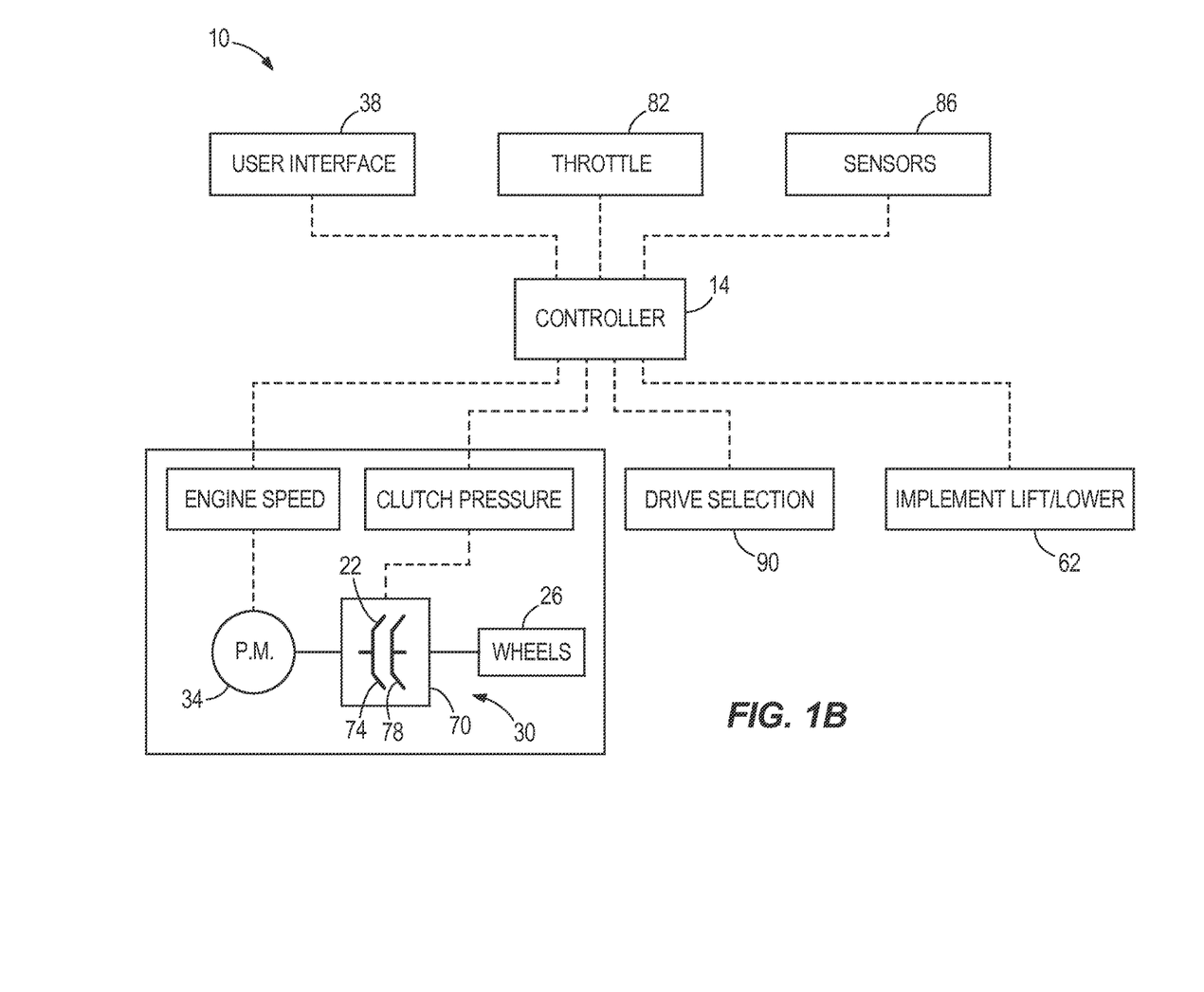
FIG. 1B is a schematic illustration of the traction control system for the traction vehicle of FIG. 1A.

A traction control system 10, illustrated schematically in FIG. 1B, having a controller 14 is described herein for a traction vehicle 18. For example, the traction vehicle 18 may include a motor grader as shown in FIG. 1A. However, the traction control system 10 described herein is not limited in its application to motor graders and may be applied to other traction vehicles. For example, the traction control system 10 can be used on vehicles such as but not limited to dirt moving equipment, snow removal equipment, sand moving equipment, forestry harvesting equipment, agricultural equipment, cargo moving equipment, mining equipment, on highway equipment, automotive vehicles, etc. The traction control system 10 can also be used on other vehicles, preferably but not limited to those equipped with a transmission containing a friction clutch or a clutch capable of slippage.

By way of example, FIG. 1 illustrates the traction vehicle 18, e.g., a motor grader, having a plurality of axles 46, 50, 54 and a plurality of wheels 26, the axles and wheels driven by a drivetrain 30, which is driven by a prime mover 34. The traction vehicle 18 may have any number of axles and drive wheels. For example, the vehicle 18 may have a first axle 46, a second axle 50, a third axle 54, and six drive wheels 26 corresponding therewith, as illustrated. The drivetrain 30 may provide power to drive some or all of the wheels 26, e.g., only the rear wheels, both the front and rear wheels, etc. The drivetrain 30 may include a drive selection mechanism 90 to selectively drive the wheels such that a user may select which wheels are driven. For example, the rear wheels may normally be powered during normal operating conditions, and the front wheels may be selectively engaged to receive a portion of the transmission output torque from the rear wheels as desired. In other constructions, other wheels may be normally powered and selectively powered in any combination. The vehicle 18 may include wheels 26 having tires, continuous tracks, or other traction devices that engage a support surface 58 (e.g., the ground). The drive wheels 26 interact directly with the support surface 58 and are responsible for vehicle 18 movement and tractive effort.

The illustrated traction vehicle 18 includes an implement 62, such as a blade, located between the second and third axles 50, 54. The implement 62 is a ground engaging tool. For example, the blade scrapes the support surface 58 to flatten the support surface 58 during a grading operation. The implement 62 may include other implements such as a ripper, a scarifier, a front attachment, a plough, a sweeper, a shovel, etc., and the vehicle 18 may include one or more of said implements. The implement 62 may be located in front of the forward-most axle (e.g., the third axle 54), behind the rearward-most axle (e.g., the first axle 46), or in between other axles. In yet other constructions, the traction vehicle 18 may include two or more implements 62 in these or other locations in any combination. The implement 62 is configured for movement generally up and down with respect to the support surface 58, e.g., in a direction Y generally normal to the support surface 58, towards and away from the support surface 58. Such movement is generally referred to herein as lift (away from the support surface 58) and lower (towards the support surface 58). The implement 62 may also include a pivot along a vertical axis YY (e.g., normal to the support surface 58) for turning a face 66 of the implement 62 from the front towards the sides. For example, the implement 62 may be electrohydraulically controlled by the controller 14 or may be controlled by other suitable mechanisms.

The prime mover 34 may include any power source to provide rotational driveline power, which includes an input power to the drivetrain 30. For example, the prime mover 34 may include, but is not limited to, an internal combustion engine, a piston engine, a rotary engine, a hydraulic motor, a hydrostatic system, an electric motor, etc. The term "engine" used throughout this document (e.g., as in "engine speed") refers generally to the prime mover 34 and is not limited to an engine or any particular type of prime mover.

The drivetrain 30 includes a transmission 70, such as a single-speed or multi-speed transmission, or infinitely-variable transmission through direct coupling means, torque converter drives, hydrostatic drives, electric motor drives, or any other transmission known now or in the future to those having ordinary skill in the art. For the purpose of the examples used herein, a direct drive multi-speed transmission is used. However, application is not limited to a direct drive transmission system. The traction control system 10 is preferably applied to any power transmission system containing a friction element, or any other transmission system capable of slippage, and can also be applied to vehicles having other power transmission systems.

The transmission 70 includes an input side 74 and an output side 78 coupled through a plurality of gears and clutches 22 or other similar frictional elements capable of transmitting torque. The input side 74 receives the input power and converts the input power to an output power on the output side 78. For example, the output power from the output side 78 drives the drive wheels 26 and may be geared directly to the drive wheels 26. Generally speaking, frictional transmission, including one or more frictional clutches, frictionally couples the input side 74 to the output side 78 to transmit movement (e.g., rotation) and/or power from the input side 74 to the output side 78. For example, it may be desirable to bring the output side 78 up to the same speed as the input side 74. When the input side 74 and the output side 78 are at the same speed, there is no slippage, or clutch slip. A pressure, or clutch pressure, is applied to the frictional coupling and can be controlled by the controller 14 to selectively increase and decrease the friction (which is proportional to the clutch pressure) between the input side 74 and the output side 78, thereby controlling transmission torque. Controlling the clutch pressure and the engine speed can affect the amount of clutch slip. For example, in a pressure-applied spring released clutch, clutch pressure can be adjusted by way of an electrohydraulic valve. The controller 14 controls current to the valve such that the clutch pressure is adjusted proportional to the current. It should be understood that the clutch pressure may be controlled in other suitable ways, particularly where other types of transmissions are employed it should be apparent that other corresponding clutch pressure adjustment mechanisms would be used.

For better efficiency, it may be desired, under normal operating conditions, to have as little clutch slip as possible between the input side 74 and the output side 78.

Referring again to FIGS. 1A and 1B, the traction vehicle 18 may have a user interface 38 for system operation, which may be located in a cab 42 of the traction vehicle 18 or other location on the vehicle or remote from the vehicle (e.g., the user interface may be a personal portable device with wireless communication to the controller 14). The controller 14 receives input from the user interface 38, from a user-controlled throttle 82 to control engine speed, and from a plurality of sensors 86. The controller 14 also has outputs for controlling clutch pressure, engine speed, implement lift and lower, and power transmission drive selection 90 (e.g., selectable wheel drive engagement to selectively direct power from the transmission 70 to the rear wheels, the front wheels, all wheels, etc.). Thus, the controller 14 is operatively coupled to the transmission 70, the prime mover 34, the implement 62, and the drive selection 90.

The sensors 86 may include any sensors suitable for each application, including but not limited to a speed sensor such as a wheel speed sensor and/or a ground speed sensor, a clutch slip sensor including an input side speed sensor and an output side speed sensor, and a clutch temperature sensor (or transmission temperature sensor).

The ground speed sensor may include a radar mechanism, global positioning system (GPS) or other suitable linear speed measurement sensor. The ground speed sensor measures the speed of the traction vehicle 18 relative to the support surface 58 and sends a ground speed signal to the controller 14. The wheel speed sensor measures the speed of at least one wheel that is powered by the transmission 70 and sends a wheel speed signal to the controller 14. The wheel speed may include a rotational speed or a linear speed (e.g., a linear speed at which the wheel would be moving based on its rotational speed with no wheel slip). The input side speed sensor and the output side speed sensor may include rotational speed sensors or other suitable sensors. The controller 14 includes a processor for making calculations, comparisons, and executing logic described in further detail below.

The controller 14 calculates wheel slip by comparing the wheel speed and the ground speed. As one example, the controller 14 may calculate a speed difference by subtracting the ground speed from the wheel speed (e.g., which may first be converted from a rotational wheel speed to a linear wheel speed as discussed above). The wheel slip may be measured in terms of a percentage, e.g., a percentage of the speed difference relative to wheel speed. When the wheel is not slipping, the wheel slip is 0%, and when the wheel is slipping completely without any traction at all, the wheel slip is 100%. In other constructions, the wheel slip may be quantified in other ways and expressed in other units, such as an absolute speed difference between ground speed and wheel speed.

As another example, the controller 14 determines clutch slip by comparing the input side 74 speed from the input side speed sensor (e.g., the engine speed) to the output side 78 speed of the transmission 70 from the output side speed sensor. The controller 14 may calculate a clutch delta (rotational slip) by subtracting the output side speed from the input side speed. The clutch slip may be measured by the clutch delta (rotational speed difference) or in terms of a percentage, e.g., a percentage of clutch delta relative to the input speed. In other constructions, the clutch slip may be quantified in other ways and expressed in other units.

As described below in further detail, during low traction conditions when wheel slipping occurs, or occurs above the threshold, it may be desirable to control clutch slip to regain wheel traction, e.g., by automatically controlling any one or more reactions, such as 1) torque redistribution through wheel drive selection 90 (e.g., sharing a portion of rear wheel torque with the front wheels or generally allocating the transmission torque to any of the wheels as desired), 2) implement lift and lower, 3) transmission torque modulation (e.g., controlling clutch pressure), and 4) engine speed modulation. The present disclosure including the traction control system 10 describes a method of allowing the operator to input a preset reaction hierarchy and then automatically managing wheel tractive effort based on the user's selected reaction hierarchy.

The torque redistribution reaction decreases wheel slip by redistributing the transmission output torque to any combination of wheels 26. For example, the rear wheels can be normally driven during normal operating conditions when the wheel slip is below a reaction threshold and the front wheels can be selectively (and additionally) driven when the measured wheel slip reaches the reaction threshold. This redistribution of torque shares rear wheel torque with the front wheels to assist the rear wheels that are slipping. However, any combination of wheels 26 can be normally driven and selectively driven to reduce wheel slip.

During the torque redistribution reaction, the controller 14 monitors torque of one or more of the selectively driven wheels (e.g., the front wheels). The torque may be calculated by the controller from the input of one or more sensors 86. The torque redistribution reaction is entered automatically by the controller 14 when the reaction threshold is reached. The torque redistribution reaction remains active until 1) the measured wheel slip drops below an exit threshold and 2) the selectively driven wheel torque drops below a threshold torque for a predetermined amount of time. The drop in driven wheel torque for a period of time indicates that the selectively driven wheels are no longer carrying significant torque, i.e., that the selectively driven wheels are no longer assisting the driven wheels by a desired amount. When the torque distribution reaction is deactivated, the torque distribution returns to normal, e.g., to power the rear wheels only. Deactivating the torque distribution mode may be desirable to improve fuel economy.

The implement lift/lower reaction decreases wheel slip by modulating vehicle load. For example, the implement 62 can be lifted when the measured wheel slip reaches a reaction threshold to reduce engagement with the ground 58, thereby lowering the load on the vehicle to reduce wheel slip. During the implement lift/lower reaction, the controller 14 monitors the measured wheel slip. The implement 62 may be lifted at a rate proportional to wheel slip, e.g., the implement 62 is lifted faster when wheel slip increases. A detailed description of the implement lift/lower reaction is described in U.S. patent application Ser. No. 14/845,190, entitled METHOD OF REGULATING WHEEL SLIP IN A TRACTION VEHICLE, filed on the same date herewith, the entire contents of which are hereby incorporated by reference.

The implement lift/lower reaction is entered automatically by the controller 14 when the reaction threshold is reached. The implement lift/lower reaction remains active until the wheel slip drops below an exit threshold or the operator manually controls the implement to move. Thus, the operator can override the auto blade movement at any time by making a manual blade movement, e.g., by sending a manual blade movement signal to the controller 14. When the implement lift/lower reaction is deactivated, the implement returns to the height of the operator's last manual blade movement signal.

The transmission torque reaction decreases wheel slip by quickly and proportionally reducing the output torque of the transmission 70. The transmission torque reaction is entered automatically by the controller 14 when a reaction threshold is reached and provides a method for automatically alternating the transmission torque as a form of torque regulation for reducing wheel slip. The system 10 operates by detecting wheel slip and then regulating clutch pressure to a friction element in the transmission 70 to limit the torque capable of being transmitted through the transmission 70, thereby limiting and regulating wheel torque, thus reducing wheel spin or slip. More specifically, the system 10 automatically reacts to wheel slip by dropping the clutch pressure from a normal clutch pressure to a lowered clutch pressure and then alternating the clutch pressure between higher and lower amplitudes repeatedly as a function of a measured level of clutch slip. When the wheel slip drops below an exit threshold, the controller deactivates the transmission torque reaction and raises the clutch pressure back up to normal clutch pressure linearly over time. Thus, transmission torque returns to the operator requested transmission torque. The transmission torque reaction is fully described in detail in U.S. patent application Ser. No. 14/845,182, entitled METHOD OF REGULATING WHEEL SLIP IN A TRACTION VEHICLE, filed on the same date herewith, the entire contents of which are hereby incorporated by reference.

The engine speed reaction reduces clutch slip resulting in lower clutch temperatures by reducing engine speed. The engine speed reaction also reduces wheel slip by controlling the engine speed. For example, lowering the engine speed proportionally to an operator's inputted engine speed signal (e.g., throttle input), or proportionally to the ground speed. The engine speed reaction is activated when the wheel slip reaches a reaction threshold and is deactivated when the wheel slip drops below an exit threshold. The engine speed is ramped back up to the operator requested engine speed when the engine speed reaction is deactivated. The engine speed reaction is fully described in detail in U.S. patent application Ser. No. 14/845,182 entitled METHOD OF REGULATING WHEEL SLIP IN A TRACTION VEHICLE, filed on the same date herewith, the entire contents of which are hereby incorporated by reference.

The transmission torque modulation reaction and engine speed modulation reaction may be defined as a single reaction, transmission torque/engine speed reaction. In the transmission torque/engine speed reaction, transmission torque modulation occurs at a wheel slip threshold and engine speed modulation begins at a clutch slip threshold. The transmission torque/engine speed reaction is fully described in detail in patent application Ser. No. 14/845,182 entitled METHOD OF REGULATING WHEEL SLIP IN A TRACTION VEHICLE, filed on the same date herewith, the entire contents of which are hereby incorporated by reference.

In operation, the operator selects one or more reactions from a set of reactions, such as but not limited to those listed above. The user may input the selections into the controller 14 by way of the user interface 38 or other suitable means. The set of reactions may also include other methods for influencing wheel slip, and may include fewer or more reactions than discussed herein. In some constructions, the reactions are pre-programmed into the controller 14 being assigned a predetermined order (also referred to herein as a hierarchy or tier or priority). The controller 14 activates the reactions in the predetermined order when respective wheel slip thresholds are crossed, as will be described in greater detail in the examples below. In other constructions, the operator selects the one or more reactions and places the one or more reactions in the predetermined order, e.g., by inputting the selections and the order into the user interface 38 and thus into the controller 14. In any case, the order is to be the order in which the controller 14 automatically activates the reactions in response to wheel slip when wheel slip is detected. The reactions are activated in sequence as wheel slip increases, rather than all at once, to maximize vehicle productivity. Tiering multiple reactions to wheel slip provides the least amount of operator reaction required to get through the wheel slip condition and inhibits over-reaction all at once which may result in loss of vehicle momentum.

Figure 2:
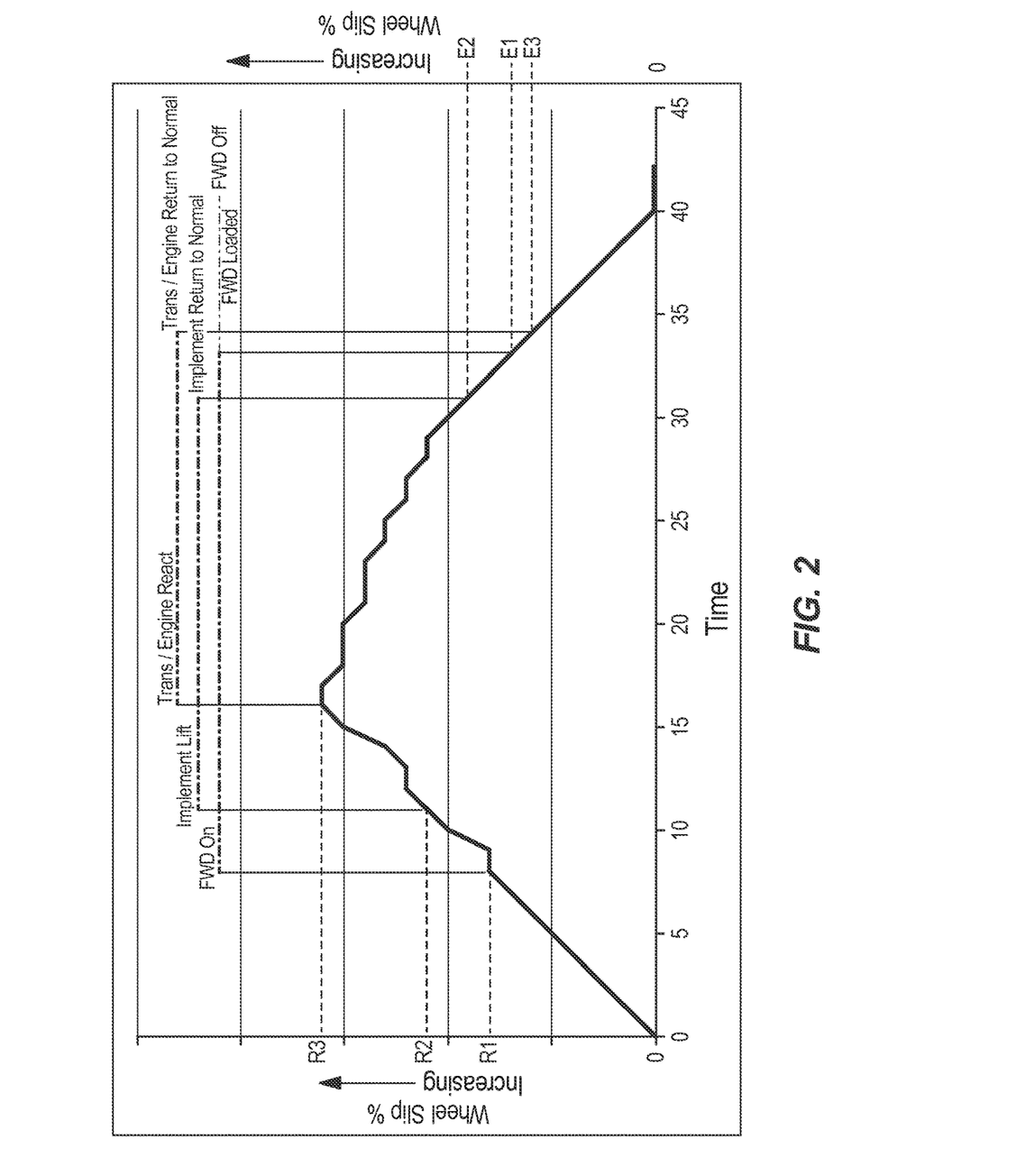
FIG. 2 is a plot of wheel slip over time illustrating wheel slip reaction states.

The controller 14 continuously monitors wheel slip of one or more of the wheels 26 being powered by the transmission 70 (e.g., as a percentage or other unit, as described above). Each reaction is activated by the controller when the measured wheel slip reaches a respective wheel slip threshold (also referred to herein as a reaction threshold). The reactions are tiered from first to last by ordering the respective reaction thresholds from lowest to highest, i.e., lowest wheel slip trigger to highest wheel slip trigger. In this way, only one reaction is triggered at the lowest threshold, and subsequent reactions are triggered at increasingly higher thresholds as necessary. For example, a first reaction has a reaction threshold R1, a second reaction has a second reaction threshold R2, a third reaction has a third reaction threshold R3, and a fourth reaction has a fourth reaction threshold R4. (As discussed above, there may be fewer or more reactions.) An example of R1-R3 is shown in FIG. 2 and will be described in greater detail below. When the reactions are tiered in order starting with the first reaction, the second reaction, the third reaction, and then the fourth reaction, then R1 is the lowest threshold, R2 is greater than R1 and less than R3, R3 is greater than R2 and less than R4, and R4 is the highest threshold.

The reaction thresholds may be preprogrammed into the controller 14 or may be user selectable by way of the user interface 38. In some constructions, the reaction thresholds are preprogrammed into the controller 14 and are tailored to a specific application, e.g., to the specific type of vehicle 18 and implement 62 and/or to prioritize fuel economy, implement productivity, etc. For example, it may be desirable to assign the lowest reaction threshold to the torque redistribution reaction, the next highest reaction threshold to the implement lift/lower reaction, the next highest reaction threshold to the transmission torque modulation reaction, and the next highest reaction threshold to the engine speed modulation reaction (as shown in the example of FIG. 2). In some applications, it may be desirable to assign the highest reaction threshold to the implement lift/lower reaction, or to eliminate the implement lift/lower reaction altogether (e.g., by the user not selecting the implement lift/lower reaction). Delaying or eliminating the implement lift/lower reaction allows the implement to maintain functionality and productivity (e.g., engagement with the ground 58) as long as possible. Any desired order of reactions is possible.

Each reaction also has an exit threshold, which is a wheel slip threshold below which the controller exits or deactivates the reaction and relinquishes normal control/operation. Each reaction is deactivated by the controller when the wheel slip drops to the respective exit threshold. For example, the first reaction has an exit threshold E1, the second reaction has an exit threshold E2, the third reaction has an exit threshold E3, and the fourth reaction has an exit threshold E4. One example of E1-E3 is shown in FIG. 2 and will be described in greater detail below. In this example, E2 is higher than E1 is higher than E3. The reactions do not necessarily deactivate in the same order they activate. The exit thresholds may be chosen based on a specific application, e.g., to the specific type of vehicle 18 and implement 62 and/or to prioritize fuel economy, implement productivity, etc. Any desired order of exit thresholds is possible.

The exit thresholds may be preprogrammed into the controller 14 or may be user selectable by way of the user interface 38. For example, it may be desirable to assign the highest exit threshold to the implement lift/lower reaction, the next lower exit threshold to the torque redistribution reaction, the next lower exit reaction threshold to the engine speed modulation reaction, and the lowest exit threshold to the transmission torque modulation reaction. The exit thresholds may be the same as their respective reaction thresholds, or different (e.g., higher or lower than their respective reaction thresholds). For example, some or all of the exit thresholds may be lower than their respective reaction thresholds to create a hysteresis effect. In some applications, it may be desirable to assign the highest exit threshold to the implement lift/lower reaction to relinquish normal implement control as soon as possible.

FIG. 2 illustrates one example of reaction tiering on a plot of wheel slip over time and is not to be regarded as limiting. The upper horizontal line represents activation of the transmission torque/engine speed reaction, the middle horizontal line represents activation of the implement lift/lower reaction, and the lower horizontal line represents activation of the torque distribution reaction (e.g., front wheel drive on). In this example, the controller 14 activates the torque redistribution reaction when the measured wheel slip reaches R1, activates the implement lift/lower reaction when the measured wheel slip reaches R2 (which is higher than R1), and activates the transmission torque/engine speed modulation reaction when the measured wheel slip reaches R3 (which is higher than R1 and R2). Each reaction is generally maintained as active when subsequent reactions are activated. For example, at time=25 seconds, all three reactions are active.

The controller 14 deactivates the implement lift/lower reaction first, i.e., when the measured wheel slip drops to E2. The exit threshold E2 from the implement lift/lower reaction is lower than the reaction threshold R2 into the implement lift/lower reaction, creating a hysteresis effect. The controller 14 lowers the implement 62 back to the most recent operator-commanded height.

The controller 14 deactivates the transmission torque/engine speed reaction when the measured wheel slip drops to E3, which is lower than E2. The exit threshold E3 from the transmission torque/engine speed reaction is lower than the reaction threshold R3 into the implement lift/lower reaction, creating a hysteresis effect.

The controller 14 deactivates the torque redistribution reaction when two conditions are met, i.e., when 1) the measured wheel slip drops to E1 and 2) when the front wheels (or other selectively driven wheels) are carrying less than a threshold torque for a predetermined amount of time, as described above. Thus, the order in which the torque distribution reaction deactivates relative to the other reactions may vary. The exit threshold E1 from the torque distribution reaction is lower than the reaction threshold R1 into the torque distribution reaction, creating a hysteresis effect. However, depending on the selectively driven wheel torque, the torque distribution reaction may be the last to be deactivated.

Thus, the invention provides, among other things, a traction control system and method for selecting and prioritizing reactions to wheel slip and automatically performing the reactions to wheel slip for the operator. The operator may select (or deselect) from a plurality of reactions for reducing wheel slip, such as 1) torque redistribution, 2) implement lift and lower, 3) transmission torque modulation, and 4) engine speed modulation. The selected reactions are prioritized to determine the order in which the reactions are initiated and the wheel slip threshold amount required to trigger initiation of the selected reactions. The prioritized reactions are automatically initiated by the controller, relieving the operator of the complex burden of reacting to wheel slip and allowing multiple reactions to be executed simultaneously. Various features and advantages of the invention are set forth in the following claims.

What is claimed is:

1. A vehicle traction control system for a vehicle having vehicle components including a prime mover, at least one wheel for providing tractive effort on a support surface and being capable of slipping, and a transmission having an input side operably coupled to the prime mover and an output side operably coupled to the at least one wheel, the traction control system comprising:
   a controller configured to react to wheel slip by automatically activating a plurality of reactions for reducing wheel slip, wherein each reaction of the plurality of reactions is activated in response to wheel slip reaching a corresponding reaction threshold, wherein the corresponding reaction thresholds are tiered in order of increasing value to define a predetermined order of activating each reaction of the plurality of reactions, and wherein the controller is configured to include an independent exit threshold associated with each reaction of the plurality of reactions such that the controller deactivates each reaction of the plurality of reactions in response to the wheel slip dropping to the respective exit threshold, wherein the exit thresholds are programmable or preprogrammable into the controller independently from the reaction thresholds.

2. The vehicle traction control system of claim 1, wherein the reaction thresholds and exit thresholds are preprogrammed into the controller.

3. The vehicle traction control system of claim 1, wherein the reaction thresholds and exit thresholds are user-selectable.

4. The vehicle traction control system of claim 1, wherein the plurality of reactions include modulating at least two or more of torque distribution to at least one wheel, implement height, transmission torque, and engine speed.

5. The vehicle traction control system of claim 4, wherein modulating the drive selection includes torque redistribution for redistributing torque to selected wheels, and modulating the implement includes lift and lower for adjusting a height of the implement.

6. The vehicle traction control system of claim 1, wherein the controller is operable to receive input from a user to select one or more reactions of the plurality of reactions.

7. The vehicle traction control system of claim 1, wherein the plurality of reactions includes a first reaction, a second reaction, and a third reaction, wherein the first reaction is activated by the controller to adjust one of the vehicle components in response to wheel slip reaching a first reaction threshold, wherein the second reaction is activated by the controller to adjust another of the vehicle components in response to wheel slip reaching a second reaction threshold, wherein the third reaction is activated by the controller to adjust another of the vehicle components in response to wheel slip reaching a third reaction threshold, and wherein the wheel slip of the third reaction threshold is greater than the wheel slip of the second reaction threshold is greater than the wheel slip of the first reaction threshold.

8. The vehicle traction control system of claim 1, wherein the plurality of reactions include modulating an implement and one or more of modulating engine speed, modulating clutch pressure, and drive selection.

9. The vehicle traction control system of claim 1, wherein the plurality of reactions programmable or preprogrammable into the controller at least include adjusting an implement height, modulating engine speed, modulating clutch pressure, and drive selection.

10. A method of automatically regulating wheel slip in a traction vehicle having a controller and vehicle components including a prime mover, at least one wheel for providing tractive effort on a support surface, and a transmission having an input side operably coupled to the prime mover and an output side operably coupled to the at least one wheel, the method comprising:
   automatically reacting to wheel slip by activating a first reaction and a second reaction for reducing wheel slip in a predetermined order;
   wherein automatically reacting to wheel slip includes activating the first reaction to adjust one of the vehicle components in response to wheel slip reaching a first reaction threshold, and activating the second reaction to adjust another of the vehicle components in response to wheel slip reaching a second reaction threshold, wherein the wheel slip of the second reaction threshold is greater than the wheel slip of the first reaction threshold,
   automatically deactivating the first reaction in response to the wheel slip dropping to a first exit threshold, and automatically deactivating the second reaction in response to wheel slip dropping to a second exit threshold, wherein the first and second exit thresholds are programmable or preprogrammable into the controller independently from the reaction thresholds.

11. The method of claim 10, further comprising programming or preprogramming the first and second reaction thresholds and the first and second exit thresholds into the controller.

12. The method of claim 11, further comprising allowing a user to select the predetermined order by way of a user interface.

13. The method of claim 10, wherein the first and second reaction thresholds are tiered in order of increasing value to define the predetermined order of reaction activation.

14. The method of claim 10, wherein activating the first reaction includes one of redistributing torque to selected wheels, adjusting a height of an implement, modulating transmission torque, or modulating engine speed.

15. The method of claim 14, wherein activating the second reaction includes a different one of the redistributing torque to selected wheels, the adjusting a height of an implement, the modulating transmission torque, or the modulating engine speed.

16. The method of claim 10, wherein activating the first reaction includes one of redistributing torque to selected wheels, adjusting a height of an implement, modulating transmission torque, or modulating engine speed, and wherein activating the second reaction includes a different one of redistributing torque to selected wheels, adjusting a height of an implement, modulating transmission torque, or modulating engine speed.

17. The method of claim 10, further comprising:
receiving input from a user, into a controller, selecting the first reaction and the second reaction for reducing wheel slip.

18. The method of claim 17, further comprising tiering the selected reactions to select the predetermined order such that the controller activates each reaction sequentially in the predetermined order as selected.

19. A vehicle traction control system for a vehicle having vehicle components including a prime mover, at least one wheel for providing tractive effort on a support surface and being capable of slipping, and a transmission having an input side operably coupled to the prime mover and an output side operably coupled to the at least one wheel, the traction control system comprising:

a controller operable to react to wheel slip by automatically activating a plurality of reactions for reducing wheel slip, wherein at least two reactions of the plurality of reactions adjust different vehicle components in response to wheel slip, wherein the plurality of reactions are tiered to respond to increasing wheel slip such that the controller is operable to activate each reaction sequentially in a predetermined order, the predetermined order being in order of increasing wheel slip, and wherein the controller is configured to include an independent exit threshold associated with each reaction of the plurality of reactions such that the controller deactivates each reaction of the plurality of reactions in response to the wheel slip dropping to the respective exit threshold, wherein the exit thresholds are programmable or preprogrammable into the controller independently from the predetermined order of activation.

* * * * *